United States Patent [19]
Bray

[11] 4,250,697
[45] Feb. 17, 1981

[54] TASSEL PULLER

[76] Inventor: Thomas B. Bray, Rte. 1, Wapella, Ill. 61777

[21] Appl. No.: 44,308

[22] Filed: May 31, 1979

[51] Int. Cl.³ ............................................ A01D 47/00
[52] U.S. Cl. ........................................ 56/51; 171/58; 56/63
[58] Field of Search ................... 56/51, 54, 56, 57, 62, 56/63, DIG. 2, 126; 171/58

[56] References Cited

U.S. PATENT DOCUMENTS

| | | | |
|---|---|---|---|
| 2,385,895 | 10/1945 | Tramontini | 56/62 |
| 2,953,209 | 9/1960 | Demarco | 171/58 |
| 3,479,805 | 11/1969 | Soteropulos | 56/14.4 |
| 3,524,308 | 8/1970 | Spry | 171/58 |
| 3,538,691 | 11/1970 | Purtell | 56/51 |
| 3,710,564 | 1/1973 | Sammann | 56/51 |
| 3,724,184 | 4/1973 | Wright | 56/51 |
| 3,769,782 | 11/1973 | Cler | 56/51 |
| 3,855,761 | 12/1974 | Louks et al. | 56/51 |
| 3,914,924 | 10/1975 | Dobson | 56/51 |
| 3,990,519 | 11/1976 | Ernst | 56/51 |
| 4,027,733 | 6/1977 | Eisenhardt et al. | 56/51 |
| 4,183,411 | 1/1980 | Bourquin | 56/51 |

Primary Examiner—Robert A. Hafer
Attorney, Agent, or Firm—Fishburn, Gold and Litman

[57] ABSTRACT

Corn detasseling apparatus and method are disclosed whereby tassels are quickly and cleanly separated from corn plants while preventing damage to the leaves and the remainder of the stalk. The apparatus includes a detasseling head having two opposed rollers with alternating ridges and grooves which extend longitudinally with respect to the rotational axis of the rollers. The ridges and grooves of each roller intermesh with those of the opposing roller to form a wavy nip, and during rotation of the rollers, the tassels are securely grasped by the nip and pulled off the plants. In addition, the ridged rollers function as impellers which create forceful air currents that flow downward and blow the leaves of the plants away from the nip. Accordingly, the tassels are removed from the plant without any rough handling or damaging of the leaves, and with minimal cutting or shredding of the tassels to form objectionable trash.

15 Claims, 6 Drawing Figures

TASSEL PULLER

BACKGROUND OF THE INVENTION

This invention pertains to apparatus and methods for removing inflorescent tassels from plants, and more particularly pertains to an improvement in detasseling heads of the type having a tassel grasping nip formed by opposed rollers, and to an associated method whereby tassels are pulled off plants while blowing the leaves of the plant away from the rollers and thereby preventing engagement of the leaves by the nip.

Production of hybridized seed corn requires removal of the tassels from the parent plants to prevent self-fertilization of the ear buds thereon. Fertilization must be accomplished instead by growing pollen-producing plants of another variety of corn in alternate rows with the parent plants, or else a selected pollen can be deposited onto the parent plants by use of a suitable vehicle such as a dusting aircraft.

Tassels can be removed from corn plants by hand, and although it is a very thorough means of detasseling that inflicts minimum damage to the stalks and leaves, it is nonetheless quite time consuming and expensive. As a result, various mechanical devices have been developed for detasseling corn, most of which can be mounted on a suitable tractor and operated with a power take-off or hydraulically. Such detasseling apparatus can be generally classified as either cutter or puller types, depending on whether they cut or pinch the tassels from the stalks, or grasp the tassels and pull them off by tugging them upwardly and longitudinally in relation to the stalks. Cutter-type devices effect detasseling in a relatively quick and thorough fashion, but are more inclined than pullers to damage the stalks and leaves of the plants. Such damage stunts growth and reduces the yield of corn, and is thus an objectionable feature of cutter-type detasselers. Puller-types are less damaging since they have the ability to grasp the tassel and pull it upward until it snaps off, hence eliminating any stalk-shattering effect. However, the puller must obtain a secure grip on the tassel in order to separate it from the stalk, and measures must be taken to prevent grasping of leaves as well as tassels lest the leaves be damaged or torn off the plant. Therefore, prior puller-type detasselers have included means for protecting the leaves such as guard bars, depressor drums and jetted streams of air.

Although mechanical tassel pullers have become popular, they have not always provided satisfactory results for a number of reasons. Prior difficulties have included failure of the puller to grasp some of the tassels tightly enough to effect full separation from the stalk, and leaf damage has occured despite the use of guards or depressors. Prior use of jetted air streams to depress, and thus protect, leaves during detasseling operations has involved use of blowers and associated ducting which are not only costly, but also difficult to install and troublesome to maintain.

SUMMARY OF THE INVENTION

It is therefore an object of the present invention to provide an improved tassel puller which overcomes the previously described problems and disadvantages associated with prior devices.

One specific object is to provide a corn detasseling head having two opposed rollers with alternating ridges and grooves thereon, and wherein the ridges and grooves of one roller intermesh with those of the other to provide a wavy nip for the grasping of tassels.

Another object is to provide a corn detasseling head having two opposed rollers that form a nip and which are shaped so as to propel air downward for blowing plant leaves away from the nip.

Still another object is to provide a detasseling head having two opposed rollers and wherein each roller is an assembly of roller segments aligned end-to-end so that only worn or damaged segments need be replaced instead of having to repair or replace an entire roller, and whereby the location of segments on a shaft can be altered from time to time to equalize wear along the length of the roller.

Even another object is to provide a detasseling head with intermeshing rollers which securely grip and separate tassels from stalks by pulling and which are not inclined to cut or shred the tassels into small pieces.

Yet another object is to provide an improved detasseling apparatus that comprises a wheeled vehicle and one or more detasseling heads thereon which fulfill the previously stated objects.

Another object is to provide an improved method for detasseling corn while minimizing damage to the stalks and leaves of the corn plants.

Other objects and advantages of the present invention will become apparent from the following description, the drawings and the appended claims.

The apparatus of the present invention is a corn detasseling head comprising two opposed rollers mounted on a roller frame, alternating ridges and grooves located at the circumferential perimeter of each roller and which extend longitudinally with respect to the rotational axis thereof, and with the ridges of each roller being insertable into the grooves of the opposing roller. The two rollers are located adjacent to each other for sequential intermeshing of the ridges of one roller with the grooves of the other, and means are included for synchronized intermeshed rotation of both rollers. One or more of such detasseling heads can be attached to respective support members that are mounted on a main frame having ground engaging support wheels, thereby providing an improved detasseling vehicle that can be driven or towed over rows of corn plants.

In the corn detasseling method of the present invention, a detasseling head is utilized which comprises a detasseling nip between two opposed rollers with ridges and grooves on the outer surfaces thereof and which extend longitudinally with respect to the rotational axis of the rollers. The detasseling head is positioned over stalks of corn in a row and is placed at an elevation that corresponds to the height of the tassels on the stalks, the head is then conveyed along the row of stalks in substantially parallel alignment therewith, and the nip is contacted with the tassels on the stalks. In order to effect pulling of the tassels without otherwise damaging the stalk or the leaves of the plant, the rollers are rotated at a speed sufficient to effect grasping and separation of tassels from the stalks, and to effect propulsion of air downward at a rate which blows the leaves away from the rollers and prevents engagement thereof by the nip.

DESCRIPTION OF PREFERRED AND ALTERNATIVE EMBODIMENTS

Figure 1:
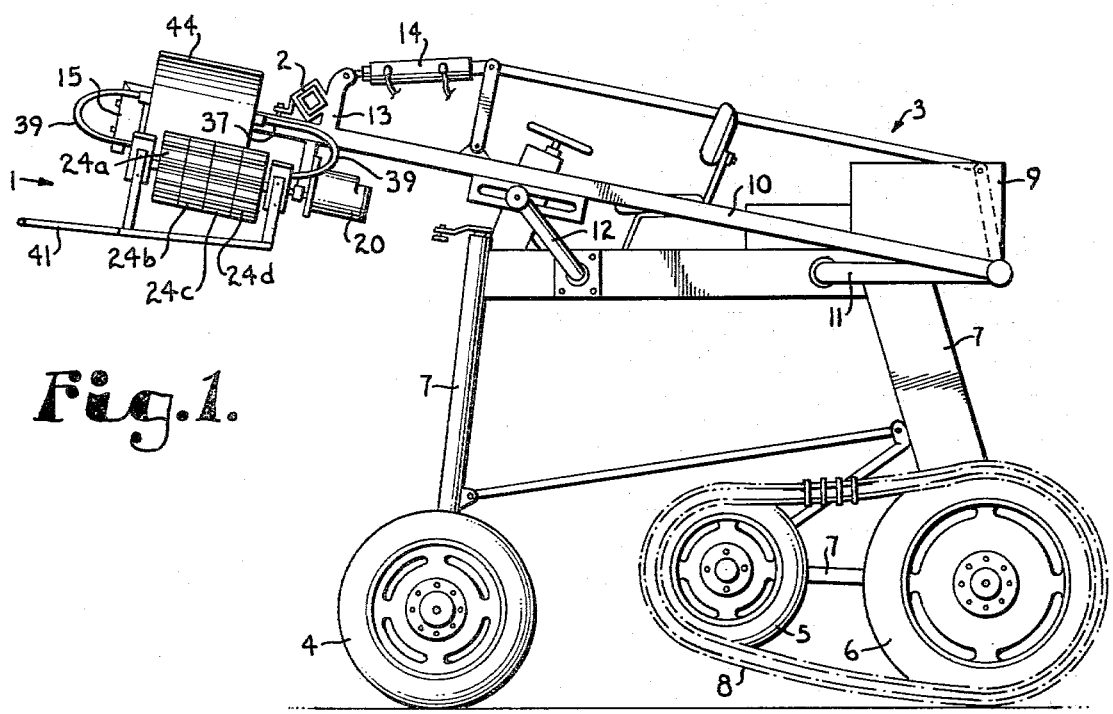
FIG. 1 is a side view of a wheeled, engine driven vehicle which has detasseling heads thereon that are constructed and operated in accordance with the present invention.
Figure 2:
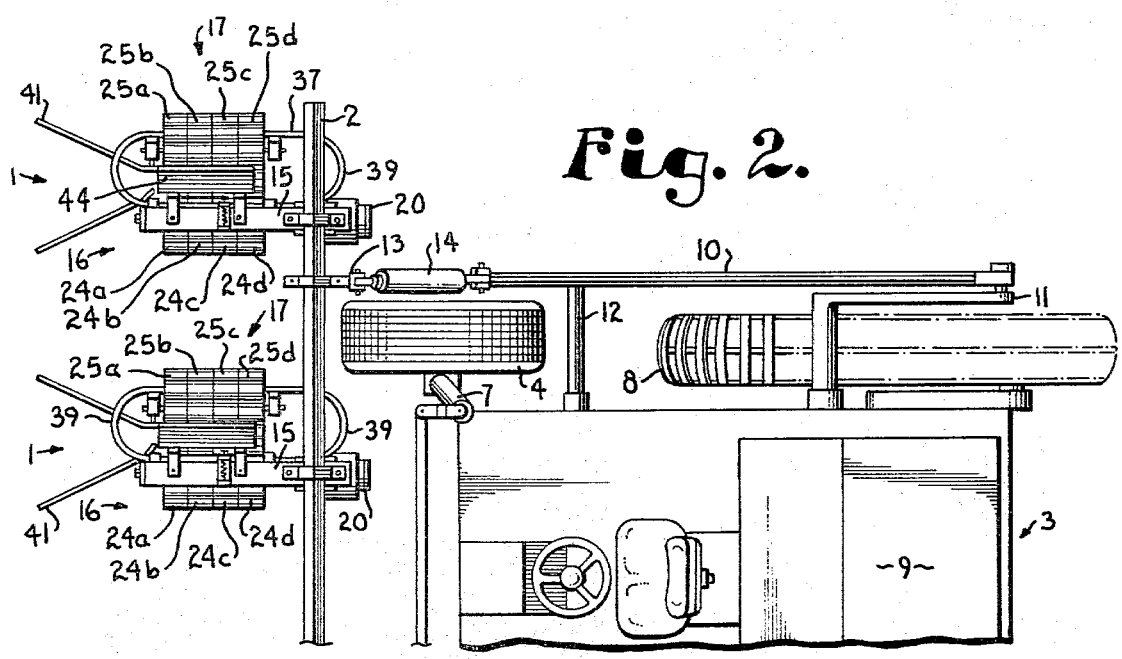
FIG. 2 is a fragmented top view of the vehicle shown in FIG. 1.

In FIGS. 1 and 2, detasseling heads 1 constructed in accordance with the present invention are attached to a frontmounted tool bar 2 on a vehicle 3 having ground engaging wheels 4, 5 and 6 mounted on main frame members 7 of the vehicle. Cleated tracks 8 extend around wheels 5 and 6 to improve traction. Wheels 4 are steerable by an operator to control the direction of travel of the vehicle, and an engine for driving wheels 5 and 6 is located in compartment 9.

Tool bar 3 having the detasseling heads thereon is mounted on a boom 10. The rear end of the boom can be raised and lowered by means of rear pivot arms 11, and the front end of the boom can be raised and lowered by means of front pivot arms 12. It will be apparent that the entire boom can be raised and lowered by respectively raising or lowering the front and rear pivot arms simultaneously, and that the front of the boom can also be raised or lowered by lowering or raising, respectively, the rear pivot arms 11 while the front pivot arms remain fixed in a selected position. Boom 10 and pivot arms 11 and 12 thus provide means for adjusting and maintaining the height of the detasseling heads 1 above the ground and, more specifically, provide means for placing and holding the heads at a selected elevation for proper engagement of tassels on corn plants with the nip of the rollers of the heads.

The tool bar 2 is mounted on tool pivoting arms 13 that are pivotally attached to the front end of boom 10. Upon actuation of the hydraulic cylinders 14, arms 13 are pivoted forwardly or rearwardly in order to swing the tool bar in the same direction. Since the rigid first member 15 of the roller frame of the detasseling head extends transversely from the tool bar and fowardly thereof, pivoting of the arms 13 rearwardly causes the front end of the detasseling heads to become more elevated, thereby increasing the angle at which rollers 16 and 17 of the detasseling heads are inclined with respect to the horizon. Conversely, pivoting of the arms 13 forwardly decreases the angle at which the rollers are inclined. The ability to adjust the incline of the rollers provides means for regulating the degree to which the feed channel 18 between the rollers (FIG. 3) is exposed for confrontal approach of the circumferential roller surfaces to tassels aligned in a row, hence facilitating the guidance of tassels into the detasseling nip 19, and also improving control over the detasseling operation as a whole.

It will be apparent from the foregoing description that both the altitude and the angle of inclination of the detasseling heads can be changed during operation of the machine illustrated in FIGS. 1 and 2, thus permitting an operator to quickly and easily make adjustments for corn plants of different heights, and for tassels of different textures and in various stages of development. In addition, each of the detasseling heads is provided with its own hydraulic motor 20 for driving the rollers 16 and 17. Use of variable speed hydraulic motors permits handy control over the rate at which the rollers are rotated, and troublesome chain or belt drives is avoided. It will thus be appreciated that the course, altitude, attitude and rotational speed of the detasseling rollers can all be nicely controlled by the operator to continuously achieve efficient removal of tassels throughout a detasseling operation, with little or no damage to the stalks and leaves of the plants.

In FIGS. 3-6, the first roller 16 and the second roller 17 of the present detasseling head are opposed to each other lengthwise, and each roller has convex ridges 21 and concave grooves 22 located at the outer circumferential perimeter thereof. The ridges and grooves on each roller are in alternating relationship to each other and extend longitudinally on the roller with respect to its rotational axis. The ridges on each roller are sized for insertion into the grooves of the opposing roller, as shown in the drawings, and the rollers are adjacent to each other for sequential intermeshing of the ridges of each roller with the grooves of the opposing roller upon rotation of both rollers. Means are included for synchronized intermeshed rotation of the rollers, e.g. roller 16 can be driven by hydraulic motor 20, with roller 17 being an idling roller that is turned as a result of the intermeshing engagement with roller 16. Alternatively, both rollers can be driven independently at the same speed.

For simplicity of design and convenience of operation, the ridges 21 and grooves 22 on the rollers can extend in substantially parallel relation to the rotational axis 23 of the rollers as shown in the drawings. Alternatively, the ridges and grooves can extend at an angle to the axis or follow a spiraling path on the roller. The ridges and grooves can have various transverse cross-sectional configurations, e.g. V-shaped, square shouldered, or U shaped, and there is an advantage to using ridges with a convex configuration and grooves with a concave configuration as shown in FIGS. 3-5 and 6. Also to advantage, adjacent ridges and grooves can be sized so that the outer surfaces thereof merge to form a sinuous circumferential surface on the roller, i.e. a wavy surface that repeatedly curves in and out smoothly without any sharp, angular bends or edges. This permits formation of a wavy nip 19 which securely grasps tassels and pulls them off the plants rather than cutting them off, and which is not inclined to cut or shred the tassels as they pass between the rollers. To further advantage, the curvature of the ridge and groove convexities and concavities, respectively, can have substantially equal radii, thereby permitting full contact of intermeshed ridges and grooves and hence maximizing gripping potential.

The rollers of the detasseling head can be constructed of any suitable material having sufficient strength and wear resistance for the purpose. To advantage, the circumferential surfaces of the rollers, including the surfaces of the ridges and grooves, can be resiliant surfaces as are provided by use of elastic polymeric materials such as cured, pigment reinforced rubber compounds. The ridged and grooved portion of the rollers can be formed, for example, by emplacement of a suitable mold around a ring-shaped piece of compounded rubber during the cure thereof, and whereby a durable cured ring is formed with the ridges and grooves on the outside, and a shoulder or bead on the inside for attachment to the rim of a metal wheel.

The rollers of the present detasseling head can be integral throughout their length, but there is considerable advantage in assembling the rollers from segments that are aligned end-to-end. Elongated, integral detasseling rollers are inclined to wear unevenly during operation, and must be entirely removed from the detasseling head frame for time consuming repair or replacement. If, on the other hand, the rollers are made up from segments aligned end-to-end to provide the necessary length, only those segments which become damaged or excessively worn need be removed for repair or replacement. In addition, the location of the segments on the rollers can be changed from time to time in order to evenly distribute the wear and maintain the shape of the rollers along their length.

Figure 3:
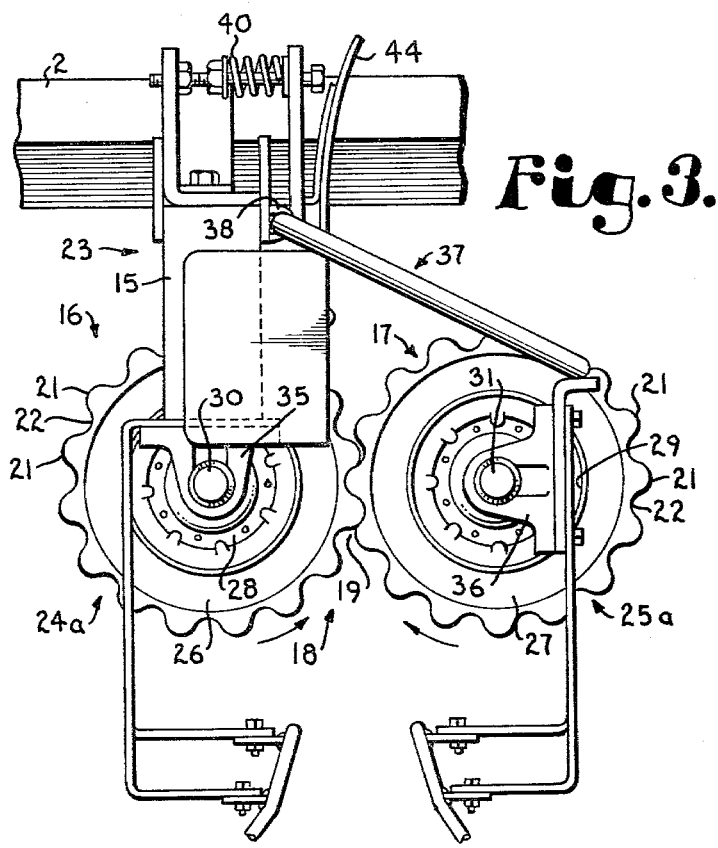
FIG. 3 is a front view of a detasseling head constructed in accordance with the present invention.
Figure 4:
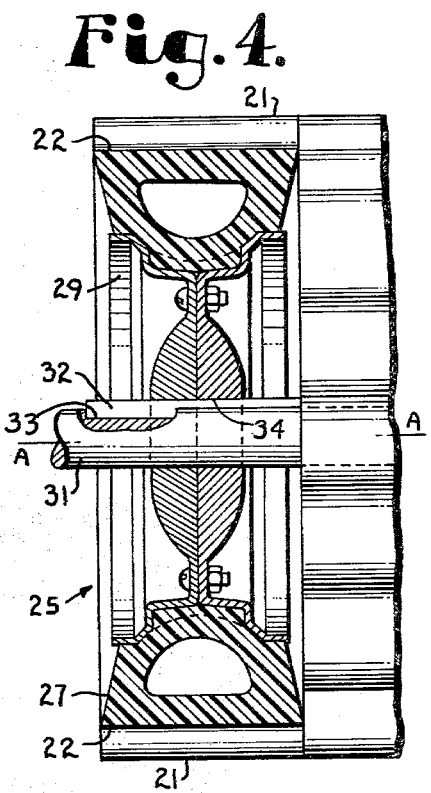
FIG. 4 is a sectional side view of a roller segment used in the roller assemblies of the detasseling head of FIG. 3.

In FIGS. 1, 2 and 3, the first roller 16 and the second roller 17 are mounted on the roller frame 23 and are made up as roller assemblies from first and second sets of cylindrical segments 23a, b, c and d and 25a, b, c and d, respectively, that are aligned in an end-to-end relationship. Rollers 16 and 17 are thus transversely segmented and are aligned side-by-side in parallel contacting relationship so that the sinuous circumferential surfaces of the cylindrical segments 24 of the first set are in contact with matching surfaces on those 25 of the second set to define the wavy detasseling nip 19. As shown in FIGS. 3 and 4, the cylindrical segments 24, 25 are made up from grooved and ridged rings 26-27 of cured tire rubber and are mounted on the rims of metal wheels 28, 29. The wheels are coupled with shafts 30, 31 using a spline 32 that fits into one keyway 33 in the shaft and another keyway 34 in the hub of the wheels. Accordingly, the roller segments 24, 25 are caused to rotate in unison when shafts 26 and 27 are turned.

The detasseling roller assemblies shown in the drawings are cylindrical, as are the segments 24 and 25 from which they are made up. Alternatively, the rollers, including any roller segments, can be frustums. Furthermore, each of the segments 24 and 25 can have the same length and diameter, or different lengths and diameters provided that such does not interfere with intermeshing of laterally opposed segments on the rollers. For convenience of design, operation, and maintenance, the segments of each roller can have substantially the same diameter, substantially parallel ends, and circumferential surfaces with a substantially straight longitudinal extension in right angle relationship to the ends.

In FIG. 3, the first roller 16 and the second roller 17 are mounted on first and second shafts 30 and 31, respectively that are mounted on the roller frame 23 of the detasseling head. The ends of the shafts are fastened in pillow block bearings 35 and 36 on first and second rigid members 15 and 37, respectively, of the roller frame, and which are thus adapted for rotation while being secured against longitudinal movement with respect to the frame. To advantage, the first roller 16 is secured against lateral movement, since frame member 16 is stationery, while the second roller 17 is hingedly mounted for lateral pivoting thereof in relation to the first roller. More specifically, the rigid second member 37 for roller 17 is attached to the rigid first member 36 by means of a hinge 38. It should be noted that the location of hinge 38 is above and to one side of the axis of rotation of the second roller. Accordingly, the second roller 17 is urged to pivot laterally by its own weight for contact with the first roller that is secured from lateral and longitudinal movement. In the arrangement shown in FIGS. 1–3, the second rigid member 37 of the roller frame includes laterally extending end portions 39 that pivot laterally with respect to roller 16, and the second roller 17 is attached to these pivoting ends 39 through pillor block bearings 36.

Several advantages are provided by suspending the rollers on the roller frame in the manner shown in the drawings. Roller 17 can be readily swung aside for servicing, examining or cleaning of the segments on either roll. In addition, the rollers will spring apart automatically to prevent damage thereto in the event feed material is too large for the nip, and the need for one or more biasing springs such as 40 for holding roller 17 against roller 16 during operation is reduced or eliminated.

Although the rollers of the present detassling head can have any preferred and practical length and diameter, there is an advantage in using rollers having a diameter of at least seven inches and a length not exceeding 18 inches. In addition, it is preferred that the rollers have a length to diameter ratio not exceeding about 1.8, and more preferably, a length to diameter ratio within the range of about 0.6 to about 1.8. To provide adequate gripping ability and propulsion of air, it is preferred that the height of the ridges on the rollers be at least one-half inch, although ridges with less height can also be used. It will be understood that the term "height" as used with reference to the ridges is intended to mean the distance from the apex of a ridge to the bottom of an adjacent groove. Rollers having a diameter within the range of about seven to about 15 inches and a ridge height of at least about three-quarters of an inch can be used to advantage, with ridge heights of about three-quarters of an inch to one and one-half inch being preferred. In one specific embodiment of the detasseling head shown in the drawings, the rollers have a length of eleven inches, a diameter of eight and one-half inches, a ridge height of about seven-eights of an inch, and each is assembled from a set of four rollers.

Use of such detasseling rollers having relatively short lengths and large diameters provides advantages over the longer and slimmer rollers of the prior art. Lower rotating speeds are required for effectively pulling tassels at an acceptable vehicle speed, a larger feed channel leading to the nip of the rollers is provided, confronting abutment of the rollers with the tassels is improved, and viewing of the detasseling process by the operator is improved. Furthermore, the inclusion of ridges and grooves on such rollers not only provides an improved grip on the tassels but also provides means for propelling air currents that blow the corn plant leaves downward so they are not grasped in the nip of the rollers. Accordingly, the height of the ridges should be sufficient to provide the volume of air needed for satisfactory depression of the leaves, but at relatively low blower speed, and without resort to a ridge height that would hamper intermeshing or weaken the integrity of the rollers.

In operation, the detasseling heads of the vehicle depicted in FIGS. 1 and 2 are positioned over stalks of corn in rows and are placed at a height which corresponds to the height of tassel on the stalks. The positioned detasseling heads are then conveyed along the rows by the vehicle while maintaining the nips of the heads in substantially parallel alignment with the stalks while contacting the tassels thereon with the nips of the rollers. Guide bars 41 on the heads help to align the stalks so that the tassels enter the feed channels 18. Throughout the detasseling process, the rollers of the detasseling heads are rotated at a speed sufficient to grasp and separate tassels from the stalks. The rotating speed of the rollers is also sufficient to propel air downward at a rate which blows the leaves on the stalks away from the rollers and prevents engagement of the leaves by the nip.

Figure 5:
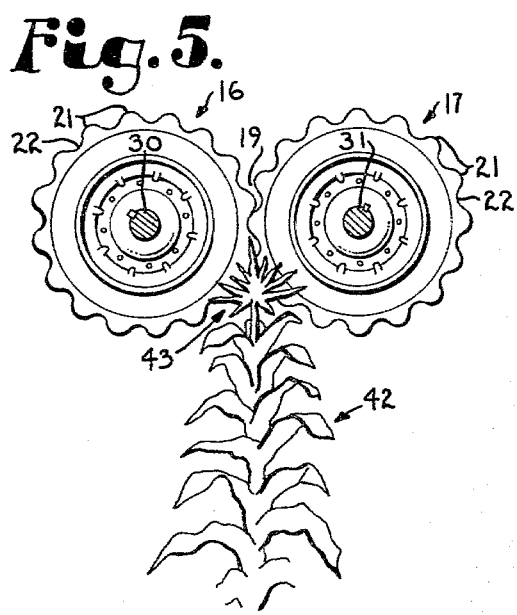
FIG. 5 illustrates initial grasping of a corn tassel by the rollers of the detasseling head of FIG. 3 during a detasseling operation.
Figure 6:
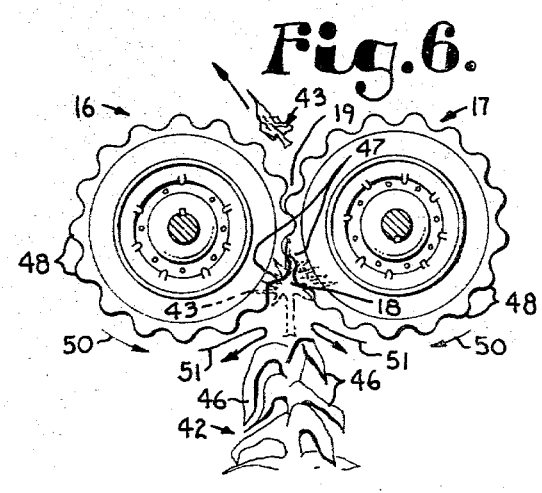
FIG. 6 illustrates separation and discharge of a corn tassel from the detasseling rollers immediately subsequent to the action depicted in FIG. 5.

FIGS. 5 and 6 depict a corn plant 42 during the process of having the tassel 43 removed in accordance with the present method. FIG. 5 depicts the plant at the moment of initial engagement of its tassel by the nip of the rollers 16 and 17. FIG. 6 shows the tassel just after it has been pulled off the plant. Tassels thus detached are thrown upward by the rollers and strike a curved shield 44 which deflects them to one side of the vehicle. FIG. 6 also depicts the air currents 50 and 51 which are blown inward and then downward and outward in relation to the stalks of the corn plants, and the bending of the leaves on the stalks downward and away from the feed channel 18 is illustrated at 46. Referring further to FIG. 6, the ridges 47 of the rollers 16 and 17 which are adjacent the feed channel 18 travel upward while the ridges 48 on the outer sides of the rollers travel downward, and air is propelled inward by the ridges toward the feed channel 18 as depicted by the arrows 50, but the air flow is of such volume that relatively little or none can pass through the nip 19. As a consequence, the counterflowing currents 50 collide and are forced to flow downward and outward as shown by the arrows 51. It is this downward and outward flow of air which bends down the leaves 46 so that they are forced away from the feed channel and out of engagement by the nip. It will be appreciated that it is not essential that the ridges and grooves of the rollers intermesh to achieve the downward and outward flow of air for the desired displacement of leaves. However, it is preferred that the rollers intermesh since loss of circulating air through the nip is thus prevented, thereby maximizing downward and outward flow of air at any selected roller speed.

From the previous description, it will be apparent that the rotational axes of the rollers of the detasseling heads are disposed substantially horizontally whereby the ridges and grooves on the rollers are aligned transversely in relation to the corn stalks. Accordingly, the tassels are not removed from the stalks by cutting, shearing or pinching, but are instead pulled off by drawing them upward and longitudinally in relation to the stalks. This preferred pulling effect can be conveniently accomplished by use of relatively firm rollers that are not subject to any substantial deformation of their circular cross section during normal operation.

In preferred embodiments of the invention the rollers can be cured, pigment reinforced, synthetic rubber rings that are mounted on wheels, and wherein the rubber has a durometer hardness within the range of about 70 to 80 and a tensile strength within the range of about 1800 psi to about 2400 psi. Also, as was previously indicated, it is preferred that the ridged and grooved surfaces of the rollers be free of any sharp shoulders or edges which would tend to cut the tassels into pieces, thereby preserving the grip on the tassels and reducing any tendency to form small sized trash. It should also be pointed out that use of intermeshing rollers prevents shredding of tassels and damage to the rollers themselves as a result of friction that occurs from slipping of one roller while in contact with the other.

It will be understood, nonetheless, that the present rollers can be run with a slight spacing between the peak of a ridge on one roller and the bottom of a ridge on the opposing groove into which the ridge has been maximally inserted. Such running of the rollers with a slight spacing can reduce the wear thereof and further minimize cutting or shredding of the tassels while still maintaining efficient grasping ability.

Apparatus and method which fulfills the previously stated objects has now been described in detail, and even though the description thereof has been with reference to specific embodiments, it will be understood that even other embodiments will become apparent which are within the spirit and scope of the invention defined in the following claims.

What is claimed and desired to secure by Letters Patent is:

1. A corn detasseling head comprising two opposed rollers mounted on a roller frame, alternating resilient ridges and grooves located at the circumferential perimeter of each roller and which extend longitudinally with respect to the rotational axis thereof, said rollers being adjacent to each other and producing sequential intermeshing of the ridges on each roller with the grooves of the opposing roller upon rotating both rollers, said ridges and grooves respectively being convex and concave in shape forming merging sinuous surfaces which repeatedly curve in and out smoothly to create a wavy nip which securely grasps tassels, and further including means for synchronized intermeshed rotation of said rollers at a speed and direction effecting propulsion of air downwardly at a rate sufficient to blow leaves on a corn stalk away from said rollers to normally prevent engagement of said leaves by said nip.

2. A detasseling head as in claim 1 wherein said rollers are substantially cylindrical.

3. A detasseling head as in claim 1 wherein said ridges and grooves of a roller extend in substantially parallel relation to the rotational axis thereof.

4. A detasseling head as in claim 1 wherein the radii of curvature and said convexities and concavities are substantially equal.

5. A detasseling head as in claim 1 wherein each of said rollers is an assembly comprising a set of roller segments aligned end-to-end.

6. A detasseling head as in claim 5 wherein said segments have substantially the same diameter, substantially parallel ends, and circumferential surfaces with a substantially straight longitudinal extension in right angle relationship to said ends.

7. A detasseling head as in claim 1 wherein each of said rollers is spindled on a respective shaft, and both shafts are mounted on said roller frame.

8. A detasseling head as in claim 1 wherein both rollers are secured against longitudinal movement with respect to said frame, one roller being secured against lateral movement with respect to an assigned axis of rotation therefore, and the other roller is hingedly mounted for laterally pivoting thereof in relation to said roller secured from lateral movement.

9. A detasseling head as in claim 1 wherein said frame includes a rigid first member having said secured roller mounted thereon, a rigid second member having said hingedly mounted roller thereon, and hinging means whereby said hingedly mounted roller is urged to pivot laterally by its own weight for contact with said secured roller.

10. A detasseling head as in claim 9 wherein said second member comprises end portions which extend laterally and pivot laterally with respect to said secured roller, and said hingedly mounted roller is attached to said ends of the second member.

11. A detasseling head as in claim 1 wherein the diameter of said rollers is at least about seven inches.

12. A detasseling head as in claim 1 wherein the length of said rollers does not exceed about eighteen inches.

13. A detasseling head as in claim 1 wherein the length to diameter ratio of said rollers does not exceed about 1.8.

14. A detasseling head as in claim 1 wherein the height of said ridges is at least one-half inch.

15. A detasseling head as in claim 1 wherein the diameter of said rollers is within the range of about seven to about fifteen inches and the height of said ridges thereon is at least about three-quarters of an inch.

* * * * *